July 19, 1938.  G. M. KRIEGBAUM ET AL  2,124,198
HOPPER CONSTRUCTION
Filed Nov. 2, 1936  2 Sheets-Sheet 1

Inventors
G. M. Kriegbaum
D. M. Morris
By [signature]
Atty.

Patented July 19, 1938

2,124,198

UNITED STATES PATENT OFFICE 2,124,198

HOPPER CONSTRUCTION

George M. Kriegbaum and David M. Morris, Richmond, Ind., assignors to International Harvester Company, a corporation of New Jersey Application November 2, 1936, Serial No. 108,744

12 Claims. (Cl. 221—122)

The invention relates to a grain drill hopper construction. More particularly it relates to an improved grain and fertilizer hopper construction.

The principal object of the invention is to provide a hopper which is of knock-down construction and is readily assembled and taken apart.

Another object is to reduce the number of parts to a minimum and obtain a combined grain drill and fertilizer hopper adapted to detachably support the dispensing mechanism or feed cups of the grain drill in a manner adding to the strength and rigidity of the hopper bottom and also to detachably support the fertilizer distributing members.

Another object of the invention is to enclose the adjusting mechanism for the fertilizer dispensers within a compartment formed by the inner portions of the grain drill and fertilizer hopper construction.

Another object is to provide a lid construction for the grain and fertilizer hopper wherein the opening of the fertilizer hopper lid automatically opens the front or grain compartment lid.

In accomplishing the foregoing objects and other minor objects, the steel fertilizer and grain hopper construction will hereinafter be described and then defined in the claims. The preferred form and the approved structure are illustrated in the accompanying drawings wherein:

It is to be understood that in previous steel hopper constructions for grain drills the grain hopper and the fertilizer hopper construction have each been of separate constructions. However, as it is necessary in most instances to sow grain and fertilizer together, it has been found that a simple improved grain hopper construction could be had in which the grain and fertilizer hopper constructions were integral, having a separating wall between the compartments, which forms both a wall for the grain hopper and a wall for the fertilizer hopper. It is, therefore, the purpose of our invention to provide a combination grain and fertilizer hopper which may be interchanged with regular types of grain and fertilizer hopper constructions and to provide a fertilizer bottom assembly wherein the peculiar shape of the lower edge of the metal partition between the grain and fertilizer hopper is utilized as a means for supporting the front edge of the fertilizer bottom plates, thereby eliminating bolts difficult of access and facilitating assembly and also in dismantling for cleaning and replacement of parts.

Figures 1, 2, 4:
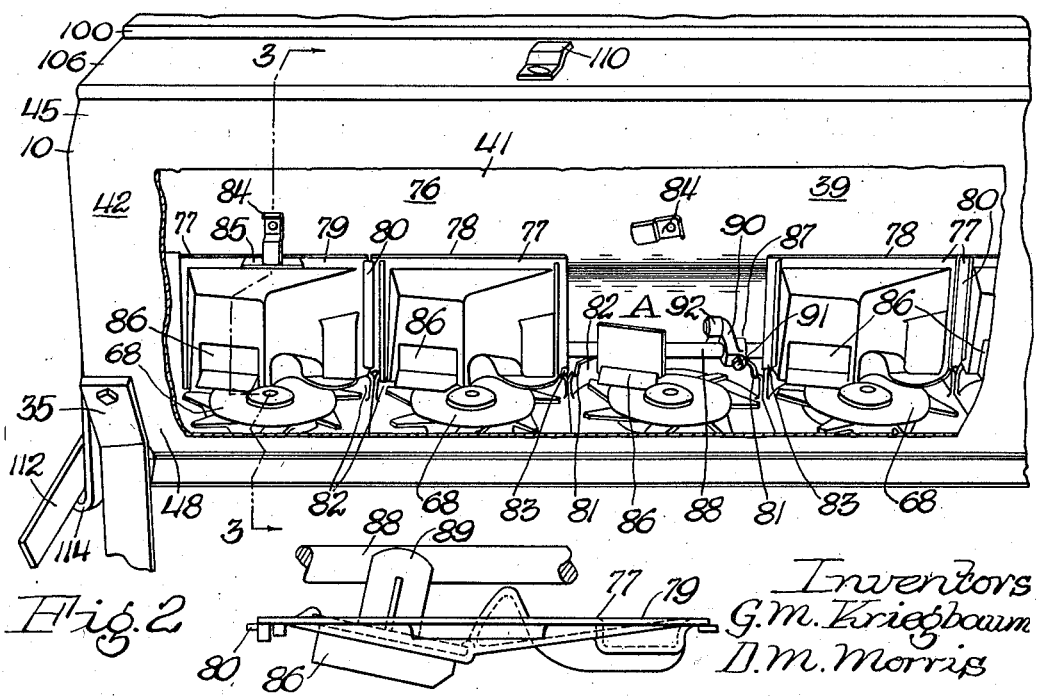
Figure 1 is a side elevation of a grain drill showing the combination grain and fertilizer hopper in place.
Figure 2 is a rear view of a portion of the fertilizer hopper with the back side cut away, showing the construction of the fertilizer mechanism and the back plates of the fertilizer hopper.

In accomplishing these objects, a combination grain and fertilizer hopper construction 10 has been provided for a well-known type of grain drill 11, as best shown in Figure 1. The grain drill 11 has a usual frame construction 12 supported by wheels 13 and an axle 14, to which the frame 12 is attached by brackets 15. Pivotally mounted to the front end of the frame 12 are furrow opener draw-bars 16. Attached to the rear end of the draw-bars 16 are disk furrow openers 17 and discharge boot 18. It is apparent that either a single disk furrow opener or a double disk furrow opener may be used. Attached to the furrow opener draw-bars are spring pressure rods 19. The pressure rods 19 are connected to pressure arms 20, which, in turn, are secured to a transverse rockshaft 21. Compensating means 22 is provided with the lifting lever mechanism, which is similar to that disclosed in the patent to Towle 1,028,403 granted June 4, 1912, to assist in raising the disk furrow openers and also to assist in applying pressure on the furrow openers when in use. The compensating mechanism 22 is connected to the rockshaft 21 by an arm 23. The spring mechanism 22 comprises a compression spring 23' surrounding a plunger 24, which is slidably mounted in a bracket 25 secured to a member of the grain drill frame 12.

A draft pole 26 is attached to the grain drill frame at its rear end and braced, as shown, by pole braces 27, which are connected at their upper ends to the pole 26 and at their lower ends to the frame 12. The pole may be adjusted in height in the usual manner.

A feed shaft 28, as shown in Figures 1 and 2, of the grain drill is driven from the axle of the grain drill by a change speed gearing of well known construction. In this construction a primary transmitting gear 29 is slidably mounted on the axle and has a plurality of teeth thereon for driving the feed shaft 28 at variable speeds. A chain 30 connects the sprockets on the seeding machine gearing to a sprocket on the feed shaft 28. In this manner the feed shaft of the grain drill is driven at variable speeds in a well known manner.

The fertilizer drive mechanism has been shown diagrammatically as being driven from the shaft 14 by a chain 31, which drives a sprocket 32 mounted on the fertilizer distributer drive shaft 33. In the usual grain drill constructions, the fertilizer drive shaft may be driven at variable speeds in order to sow different quantities of fertilizer per acre. Any well known change speed mechanism may, therefore, be used and this simplified drive is shown only for the purpose of showing an operative device.

Figure 3:
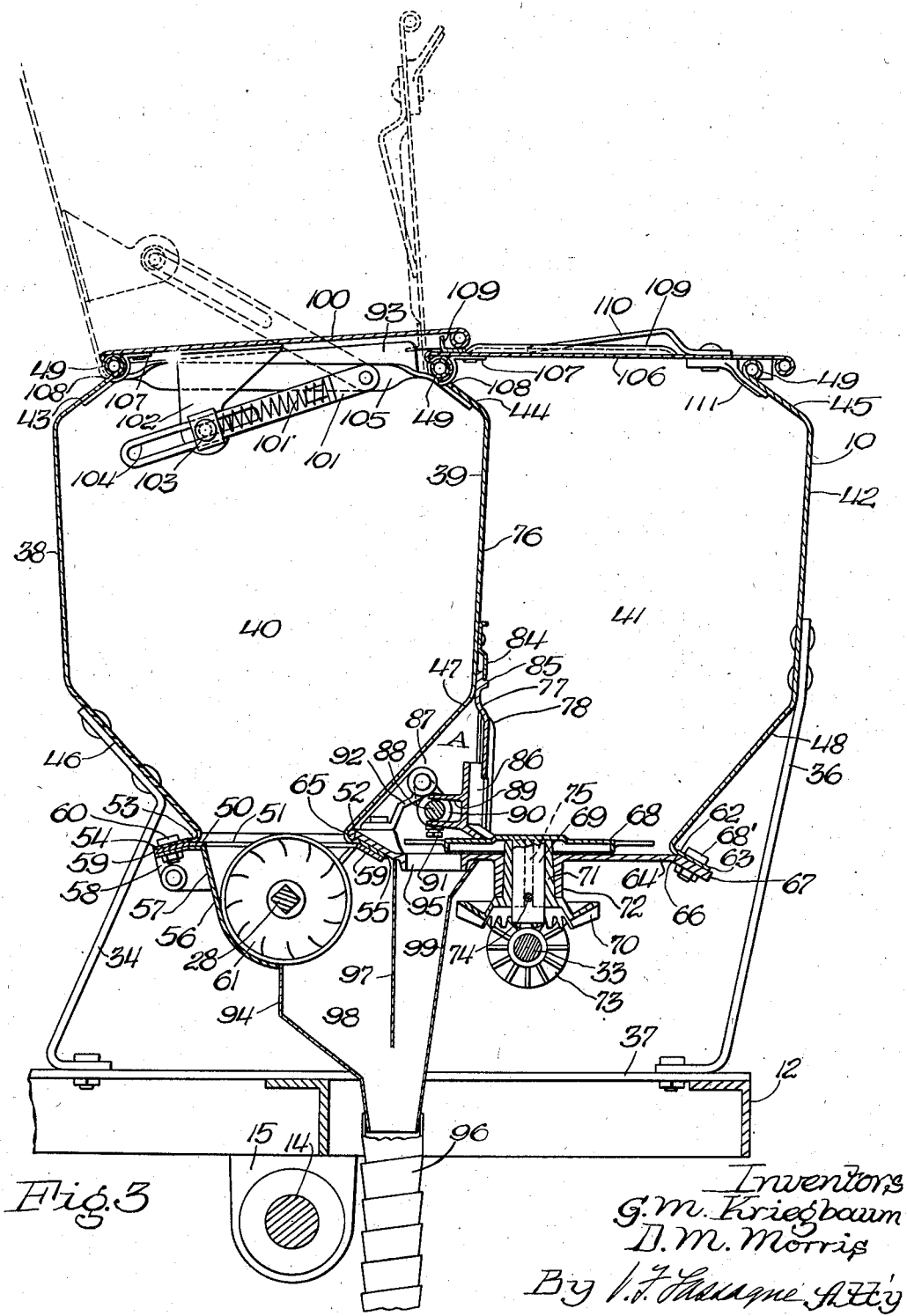
Figure 3 is an enlarged sectional view of the combined grain and fertilizer hopper taken along line 3—3 of Figure 2 and looking in the direction of the arrows; and, Figure 4 is an enlarged plan view, showing a fertilizer back plate and a portion of the fertilizer gate adjusting rod.

The combination grain and fertilizer hopper which is the main object of our invention is best shown in Figures 2 and 3. The combination grain and fertilizer hopper 10 is supported on the grain drill frame 12 by front supporting braces 34 and rear supporting braces 35. A center supporting brace 36, as best shown in Figures 1 and 3, is attached to the fertilizer hopper at its upper end and to a center longitudinal supporting member 37 of the frame 12. The construction of the supporting members 34, 35 and 36 is such as to support the entire weight of the steel hopper construction and the weight of the grain and fertilizer when filled. The grain hopper construction is similar to that disclosed in the patent to Cady et al. 1,864,294, June 24, 1932, and, therefore, the details of this construction need not be described in full and only such parts of the hopper construction will be described as show the new fertilizer construction and the means for attaching the fertilizer hopper bottom.

As best shown in Figure 3, the combination grain and fertilizer hopper construction 10 has a front sheet metal wall 38, and a center sheet metal wall 39 separating the grain hopper 40 from the fertilizer hopper 41. A rear sheet metal wall 42 is provided, which is similar in section to the walls 38 and 39. All of the sheet metal walls 38, 39 and 42 are formed from rolled sections, which are identical in detail as to the form of the sides and the upper portions 43, 44 and 45 and the lower portions 46, 47 and 48. The upper edges of the walls 38, 39 and 42 are formed with a rolled bead 49 to provide a finished edge to the hoppers, so that the operator will not be injured in any manner. Attached to the bottom of the grain hopper 40 is a plurality of plates 50, which form the bottom of the hopper.

The plates 50 may be provided with openings or apertures 51 rectangular in shape and spaced longitudinally, or formed in such a manner as to form a plurality of openings 51. The bottom plates 50 extend across the bottom of the hopper and overlap the horizontal portions 52 and 53 of the sheet metal walls 39 and 38, respectively. The walls 38 and 39 also have outwardly and downwardly extending portions 54 and 55, respectively. The edges of the bottom plates 50 terminate at the junction of the horizontal portions 52 and 53 of the flanges and the downwardly extending portions 54 and 55. Feed cups 56 are positioned below the bottom plates and in registration with the openings 51. The cups 56 are provided with an end wall 57, as best shown in Figure 1, and disclosed in the aforementioned patent to Cady et al. The end walls of the cups 56 have their upper extremities formed as ledges which abut the bottom plates adjacent the openings 51 and have side walls, not shown, which extend into the openings along the sides thereof and form grain tight joints with the bottom plates. The feed cups are also provided with lateral extensions 58 in the form of flanges extending downwardly at the same angle as the side flanges 54 and 55. The extensions 58 are spaced from the side flanges a thickness substantially greater than the thickness of the bottom plates for a purpose hereinafter described.

Bars 59 are positioned between the side flanges of the hopper walls and the extensions 58 on the casing and the parts are fastened securely in position by bolts 60. The bars 59 extend longitudinally the length of the hopper and laterally to the edge of the bottom plates 50, terminating at the junction of the horizontally and downwardly extending portions of the side flanges. In this instance the feed cups 56 are fitted with double-run feed wheels 61 for dispensing the grain thereto from the hopper 40 through the openings 51 in the bottom plates. The drive shaft 28 extends through the feed cups 56 and carries the feed wheels 61. The improved grain hopper as shown and described is simple to manufacture and readily assembled or taken apart and is substantial and durable. The grain hopper 40 proper is composed of several simple parts,—flat bottom plates 50 and two similar side members 38 and 39. The flat bottom plates 50 fit against the aligned bottom portions or ledges 52 and 53 of the side flanges to form a grain tight joint. The ledges on the end walls 57 of the cups 56 hold the bottom plates securely in position, and feed cups of different types, such as the double-run or fluted type, may be interchangeably used on the same bottom plates. The edges of the bars 59 also abut the edges of the bottom plates and hold them in position in the spacings between the casings. It is also obvious that other types of bottom constructions for grain hoppers may be used.

The fertilizer hopper 41 is somewhat similar in construction to the grain hopper 40. The fertilizer hopper 41 has for one of its walls the center dividing wall 39 between the grain and fertilizer hoppers 40 and 41. The rear sheet metal wall 42 forms the other wall of the fertilizer hopper. The rear wall 42 is formed similarly to the wall 39 and has a portion 62 similar to the portions 52 and 53 of the walls 38 and 39. The portions 62 extend downwardly and rearwardly, as at 63, and are similar to the portions 54 and 55 of the members 38 and 39.

The bottom of the fertilizer hopper 41 is divided into a plurality of sections, each section corresponding to a down-spout to one of the boots of the furrow opener. Each section, therefore, is formed by a fertilizer plate 64. This fertilizer bottom plate extends across the bottom of the fertilizer hopper 41 and the length of each bottom plate is sufficient to cover each section corresponding to the down-spout. The inner portion of the fertilizer bottom plate is formed, as best shown in Figure 3, to engage the inner wall member 39. The inner edge of the bottom plate 64, as at 65, is, therefore, formed with a surface conforming to the rolled edge between the portions 47 and 55 of the inner wall 39. As this surface extends the length of the bottom plate, it is obvious that a tight joint is formed preventing any fertilizer from sifting through. The rear edge of the bottom plate 64 has a ledge, as at 66, extending the length of the bottom plate and conforming to the rolled edge between the members 48 and 63 of the rear wall 42. This construction enables a tight joint to be formed between the rear wall and the bottom plate 64. Lugs 67 are formed on the bottom plate and are shaped to conform to the downwardly extending flange 63 of the rear wall 42. A bolt 68' secures the bottom plate 64 to the rear wall 42. It is, therefore, obvious that with this construction each bottom plate 64 may be readily removed for cleaning or for replacing repairs by removing the bolt 68' and dropping the bottom plate, which at its inner end is readily detachable because there are no bolts to secure it to the inner or center wall 39. In a like manner the bottom plate 64 may be readily replaced.

Mounted on the fertilizer bottom plate 64 for rotation is a fertilizer agitator 68, as best shown in Figures 2 and 3. Each agitator 68 has a downwardly extending shaft portion 69, to which is secured a bevel gear 70. The bevel gear has a tapered portion 71 journaled in a complementary journaled portion 72 of the bottom plate
64. With this type of joint between the bevel gear 70 and the plate, it is obvious that a sealed joint is formed, so that, as the bevel gear rotates, fertilizer will not sift through the bearing construction. As there is an agitator for each bottom plate, it is obvious that it is necessary to provide on the fertilizer drive shaft 33 a bevel gear 73 to drive the bevel gear 70. It is, therefore, obvious that, as the fertilizer drive shaft 33 is operated from the sprocket 32 and chain 31 in a well-known manner, each of the fertilizer agitators 68 will in turn be rotated. It is also obvious that any type of change speed mechanism may be used in order that the amount of fertilizer sown may be increased or decreased at will. However, as this is not the subject of our invention, only a simple type of fertilizer drive mechanism has been disclosed.

Between each of the bottom plates 64 an overlapping joint is formed. This is well known in fertilizer hopper construction and is not illustrated. It is, therefore, evident that a simple fertilizer hopper construction has been formed integral with the usual form of grain drill hopper in which one of the walls of the grain drill hopper acts as a wall of the fertilizer hopper and that individual bottom plates are provided for each down-spout, each of the fertilizer bottom plates being readily detached from the fertilizer hopper for replacing and cleaning.
Each fertilizer agitator 68 may be readily detached by raising upwardly because of the bayonet type of connection between the member 69 and the bevel gear 70. The bayonet type of connection is formed by means of a pin 74 secured in the member 69 and the pin 74 engaging a slot 75 in the bevel gear 70.

The inner wall of the fertilizer hopper 41 is formed in a substantially vertical position. The inner wall 76 of the fertilizer hopper is formed from the vertical portion of the wall 39 and from back plates 77. The back plates 77 are divided into sections similar to corresponding sections of the fertilizer bottom plates. Each back plate is interlocked with its adjacent back plate and is also detachably secured to the inner wall 39 between the grain hopper 40 and the fertilizer hopper 41. The fertilizer back plates 77 are made in two types, one such as is shown in Figure 2, which does not have overlapping joints and which is numbered 78. The other numbered 79 has overlapping joints 80. The back plates 78 are detachably secured in position by means of the notches 81 in an upwardly extending wall portion 82 of the fertilizer bottom plates. Each of the back plates 77 is formed with lugs 83 which engage the notches 81. Latch members 84 are pivotally mounted on the inner wall 39, as best shown in Figures 2 and 3, and are adapted to engage a portion or notch 85 of the back plates 79. It is only necessary to have alternate plates engaged in this manner because of the overlapping joints 80, which in turn retain the back plates 78 in position. It is, therefore, evident that each back plate may be readily removed for cleaning and repairing, and especially for cleaning slides or gates 86 in the back plates. From the construction described the back plates 77 form with the portion 47 of the wall 39 and the bottom plates 64 a triangular shaped chamber A. This triangular shaped chamber is so positioned at substantially the center of the combined fertilizer and grain hopper constructions that it forms a chamber in which may be readily located or mounted the fertilizer gate rod adjusting means 87. The triangular shaped chamber A extends the full length of the grain and fertilizer hoppers 40 and 41.

The gate rod adjusting mechanism 87 comprises a transversely extending gate rod 88, which slidably engages each fertilizer gate 86 slidably mounted in the back plates 77. The gate rod 88 engages a forwardly extending U-shaped construction 89. The gate rod 88 is pivotally mounted for vertical movement by means of supports 90. Each support 90 is adjustably secured to the gate rod 88 by means of a set screw 91, as best shown in Figures 2 and 3. Each fertilizer bottom plate 64 has a supporting bracket 92 secured thereto at the inner portion of the fertilizer bottom plate 64. It is so positioned as to be within the chamber 87. Each support 90 for the gate rod 88 is journaled in the bracket 92. It is, therefore, evident that, by releasing the set screw 91 and sliding the support 90 on the adjusting gate rod 88, the gate rod 88 may be detached from the brackets 92, if necessary.

As best shown in Figure 2, the back plate is removed, showing the adjusting gate 86 standing in its vertical position. To do this, it is necessary to slide the back plate vertically. In this instance, the fertilizer gate 86 may be readily detached from the gate rod 88 by sliding the gate 86 rearwardly. Usually, the back plates 77 and fertilizer gates 86 are removed together simply by releasing the latches 84 and removing the back plates rearwardly. Then, if necessary, the fertilizer gates may be removed from the back plates.
It is also apparent that the back plates, the fertilizer gates, the gate adjusting rod, and the bottom plates may be readily removed for cleaning and repairing.

It is, therefore, obvious, with this construction of combined fertilizer hopper and grain hopper, that the pocket or chamber which is formed by the taper on the lower portion of the metal partition 39 is utilized for housing the gate rod mechanism for control of the fertilizer quantity gates 86 and permits the use of straight back plates 77, which form, in connection with the perpendicular portion of the metal partition, a practically perpendicular wall 76 for the entire front of the fertilizer compartment 41 with no ledges of consequence to obstruct the material from reaching the fertilizer discharge element. It is also obvious that, in the special feature of the fertilizer bottom assembly which utilizes the peculiar shape of the lower edge of the metal partition as a means of supporting the front edge of the fertilizer bottom plates, bolts difficult of access are eliminated, and assembly and dismantling for cleaning and repairing are facilitated.

The completed fertilizer hopper and grain hopper construction is formed by adding sides 93 which are secured in a well-known manner to the walls 38, 39 and 42 to provide a sealed hopper construction.

As it is necessary to sow the grain and the fertilizer together, a sheet metal down-spout 94 is provided for each seed cup 56 and fertilizer opening 95. A fertilizer opening 95 corresponds in position in the fertilizer bottom plate 64 to the grain opening 51 in the grain hopper bottom plates 50. Down-spouts 94 are provided for each furrow opener 17. A spiral outlet, flexible tube 96 connects each down-spout 94 with its corresponding boot 18. Each down-spout 94 has a member 97 separating the down-spout 94 in two chambers 98 and 99, respectively, corresponding to the grain and fertilizer hoppers. The member 97, however, extends only part way in the down-spout 94, so that the grain and fertilizer is finally discharged together down the spiral tube 96. It is obvious that, as the agitator 68 revolves, fertilizer will be discharged through the opening 95 into the chamber 99 of the down-spout 94. It is also evident that, as the double-run wheels 61 revolve, grain will be discharged from the grain hopper 40 through the opening 51 into the chamber 98 of the down-spout 94. As the grain and fertilizer drop through the discharge tube 96 to the boot 18, it is then directed against the furrow openers 17 to be drilled into the ground.

Closures have been provided for the grain hopper 40 and the fertilizer hopper 41. A closure or lid 100 for the grain hopper 40 is pivotally mounted on the forward wall 38 of the grain hopper in the usual manner, so that it may be raised vertically. When the lid 100 is opened to its dotted position, it is held there by means of the latch mechanism formed by a pivoted link 101 and a fixed member 102 secured to the lid. The member 102 has a pin 103 engaging a slot 104 in the member 101. It is, therefore, evident that the lid may be latched in its raised position. The link 101 is pivotally mounted on a support 105 extending across the hopper 40 and secured by welding or otherwise to the portions 43 and 44 of the walls 38 and 39. A spring 101' may be mounted on the member 101 to keep the cover in its closed or open position.

The lid 100 is so formed as to overlie at its rear end a lid 106 for the fertilizer hopper 41. The fertilizer hopper lid 106 is formed, as best shown in Figure 3, so as to be hinged on the beaded portion 49 of the inner wall 39. The hinges for the lid 100 and 106 are formed by the lids and the beaded portion 49 of the walls 38 and 39. Strap members 107 are secured to each lid and so formed as to pass through a slot 108 formed adjacent the beads 49 in the portion of the walls 43 and 44 of the front and inner walls 38 and 39. A seal is formed between the lid 100 and the lid 106 by means of an angle iron 109 welded or otherwise secured to the lid 106 and extending the length of both lids. It is, therefore, obvious that rain cannot run into the hopper 40, but will be drained across the lid 106 to be discharged over the sides of the hopper. As the lid 100 overlies the lid 106, it is evident that, as the lid 106 is raised, the lid 100 will also be raised a short distance, and the lid 100 in its final position may be positioned by moving the lid slightly forward. To aid the lid 100 in being raised by the lid 106, tracks 109 are raised in the lid 106. The lid 106 may be locked in closed position by means of a handle 110 on a latch 111, which engages the underportion of the upper wall portion 45 of the fertilizer hopper 41.

The fertilizer gates 86 are adjusted by means of a handle 112 pivotally mounted on the left side of the grain drill. The handle 112 is pivotally mounted as at 113 to the side 93 of the grain hopper 10. The quantity sowed by the fertilizer drill is measured on a quadrant 114 positioned on the side wall 93 of the hopper. Notches 115 are provided for each adjusted position. A slot 116 is formed in the side wall 93, through which the adjusting gate rod 88 passes and is secured to a handle bracket 117. It is evident that different quantities of fertilizer may be sown with the same gate adjustment by providing a change speed mechanism for the fertilizer drive shaft.

It will be evident that there has been provided a knock-down combined grain and fertilizer hopper construction for grain drills which may be readily assembled in manufacture, and disassembled for cleaning and repairing. It is also evident that a new fertilizer hopper bottom construction and fertilizer back wall construction has been provided wherein the various parts of the discharge mechanism of the fertilizer may be detached for cleaning and repairing. It is also evident that a compartment has been formed by the grain hopper and the fertilizer hopper wherein the gate adjusting mechanism may be placed in an out-of-the-way position without interfering with the operation of the mechanism. It is also evident that there has been provided a novel lid construction for the combined grain and fertilizer hopper wherein, as the lid for the fertilizer hopper is opened, the lid for the grain hopper is also opened.

The preferred embodiment of the invention herein described is capable of certain modifications without departure from the scope of the invention to be defined in the following claims.

What is claimed is:

1. A dispensing unit formed of adjacent metal hoppers comprising three metal members which are substantially parallel over a portion of their lengths and of which the two outer members converge over a further portion and the middle member parallels one outer member over the said further portion, a plate extending in the same plane as the first named portion of the middle member from the meeting point of the portions, a closure member comprising an adjustable fertilizer-feeding mechanism carried by the second named portion of the inner member and the corresponding portion of the other outer member, and means for adjusting the fertilizer-feeding mechanism mounted in the space enclosed by the plate, the second named portion of the middle member and the closure member.

2. A dispensing unit formed of adjacent hoppers, comprising two outer side wall members substantially parallel over a portion of their lengths and converging over a further portion, a middle member having a first portion parallel with the first named portion of the outer members and a second portion parallel with the second named portion of one of the outer members and converging with the second named portion of the other of the outer members, a plate extending from the juncture of the first and second portions of the middle member in line with the first portion, an adjustable feeding mechanism mounted adjacent the parallel second named portions of the middle member and the second outer member, and means for adjusting the feeding mechanism positioned in the space between the plate and the second portion of the middle member.

3. A dispensing unit formed of two hoppers, comprising spaced side members, an intermediate member dividing the space between the side members and having a first portion toward one end inclined with respect to a second portion of the member, a plate extending from the juncture of the two portions and in substantially the same plane as the second portion, an adjustable feeding mechanism mounted adjacent the plate and the other side member, and means for adjusting the feeding mechanism mounted between the plate and the inclined portion of the intermediate member.

4. A double hopper dispensing unit, comprising spaced side members, an intermediate member dividing the space between the side members and having a portion toward one end inclined with respect to the remainder of the member, a bottom plate extending between the end of the inclined portion and the side member away from which the inclined portion extends and perpendicular to the remainder of the intermediate member, a back plate extending perpendicularly from the bottom plate up to and in line with the said remainder of the intermediate member, an adjustable feeding mechanism mounted in the bottom plate, and means for adjusting the said feeding mechanism positioned in the space enclosed by the bottom plate, the back plate and the inclined portion of the intermediate member.

5. A dispensing unit composed of adjacent hoppers, comprising spaced side members, an intermediate member dividing the space between the side members and having a portion toward one end inclined with respect to the remainder of the member, a bottom plate extending between the end of the inclined portion and the side member away from which the inclined portion extends and perpendicular to the remainder of the intermediate member, a back plate having an opening therein and extending perpendicularly from the bottom plate up to and in line with the said remainder of the intermediate member, a feeding mechanism mounted on the bottom plate adjacent the opening in the back plate, an adjustable gate mounted in the opening for controlling the quantity delivered by the feeding mechanism, and means for adjusting the gate mounted in the space enclosed by the bottom plate, the back plate and the inclined portion of the intermediate member.

6. A dispensing unit composed of adjacent hoppers, comprising spaced side members, an intermediate member having a portion toward one end inclined with respect to the remainder of the member, a bottom plate extending between the end of the inclined portion and the side member away from which the inclined portion extends, a back plate having an opening therein and extending from the bottom plate up to and in line with the said remainder of the intermediate member, a feeding mechanism mounted on the bottom plate adjacent the opening in the back plate, an adjustable gate mounted in the opening for controlling the quantity delivered by the feeding mechanism, and means for adjusting the gate mounted in the space enclosed by the bottom plate, the back plate and the inclined portion of the intermediate member.

7. A dispensing unit composed of adjacent hoppers, comprising spaced side members, an intermediate member having a portion toward one end bent away from a larger portion of the member and a portion at the very end reversely bent toward the plane of the larger portion, a bottom plate supported at one side on the second bent portion and on the other side by the side member away from which the first bent portion extends, a back plate extending from the juncture of the larger portion and the first bent portion to the bottom plate, an adjustable feeding mechanism mounted on the bottom plate, and means for adjusting the feeding mechanism mounted in the space enclosed by the back plate, the bottom plate and the first bent portion of the intermediate member.

8. A dispensing unit composed of adjacent hoppers, comprising spaced side members, an intermediate member having a portion toward one end bent away from a larger portion of the member and a portion at the very end reversely bent back toward the plane of the larger portion, a bottom plate mounted at one side on the second bent portion and carried at the other side by the side member away from which the first bent portion extends and substantially perpendicular to the larger portion of the intermediate member, a back plate extending substantially perpendicularly from the bottom plate up to and in line with the larger portion of the intermediate member, a feeding mechanism mounted on the bottom plate, and means mounted in the space enclosed by the back plate, the bottom plate and the first bent portion of the intermediate member for varying the quantity delivered by the feeding mechanism.

9. A dispensing unit composed of adjacent hoppers, comprising spaced side members, an intermediate member having a portion toward one end bent away from a larger portion of the member and a portion at the very end reversely bent toward the plane of the larger portion, a bottom plate mounted at one side on the second bent portion and carried at the other side by the side member away from which the first bent portion extends, a back plate extending from the bottom plate up to the juncture of the first bent portion and the larger portion of the intermediate member and in substantially the same plane as the intermediate member, a feeding mechanism mounted on the bottom plate, and means mounted in the space enclosed by the back plate, the bottom plate and the first bent portion of the intermediate member for varying the quantity delivered by the feeding mechanism.

10. A dispensing unit composed of adjacent hoppers, comprising spaced side members, an intermediate member having a portion toward one end bent away from a larger portion of the member and a portion at the very end reversely bent back toward the plane of the larger portion, a bottom plate mounted at one side on the second bent portion and carried at the other side by the side member away from which the first bent portion extends, a back plate having an opening therein and extending from the bottom plate up to the juncture of the first bent portion and the larger portion of the intermediate member and in line with the larger portion, a feeding mechanism mounted on the bottom plate adjacent the opening in the back plate, an adjustable gate mounted in the opening in the back plate for controlling the quantity delivered by the feeding mechanism, and means for adjusting the gate mounted in the space enclosed by the bottom plate, the back plate and the first bent portion of the intermediate member.

11. A dispensing unit composed of adjacent hoppers, comprising spaced side members, an intermediate member having a portion toward one end bent away from a larger portion and a portion at the very end reversely bent toward the plane of the larger portion, a bottom plate mounted at one side on the second bent portion and extending to the side member away from which the first bent portion extends and perpendicular to the larger portion of the intermediate member, a back plate having an opening therein extending substantially perpendicularly from the bottom plate up to and in line with the larger portion of the intermediate member, a feeding mechanism mounted on the bottom plate adjacent the opening in the back plate, an adjustable gate mounted in the opening in the back plate for controlling the quantity delivered by the feeding mechanism, and means for adjusting the gate mounted in the space enclosed by the bottom plate, the back plate and the first bent portion of the intermediate member.

12. A dispensing unit composed of adjacent hoppers for grain and fertilizer, comprising side members and an intermediate member, each of sheet metal and shaped to have a substantial main portion, an inclined portion toward one end bent away from the main portion and a flange at the very end reversely bent toward the plane of the main portion and arranged so that the side members are symmetrically placed with the main portions parallel and the inclined portions convergent and the flanges divergent and the intermediate member placed with the portions thereof substantially parallel to corresponding portions of one of the side members, a bottom plate mounted at one side on the flange of the intermediate member and at the other side supported from the flange of the side member which is generally parallel to the side member and substantially perpendicular to the main portions of the side and intermediate members and having a fertilizer discharge opening therein adjacent the flange of the intermediate member, a fertilizer-feeding wheel mounted on the bottom plate and parallel thereto, a back plate having an opening therein and extending in line from the main portion of the intermediate member toward the bottom plate, a gate slidable across the opening in the back plate for varying the quantity delivered by the fertilizer-feeding wheel, and means for adjusting the position of the gate mounted in the space enclosed by the bottom plate, the back plate and the inclined portion of the intermediate member.

GEORGE M. KRIEGBAUM.
DAVID M. MORRIS.